US009268875B2

(12) United States Patent
Campbell et al.

(10) Patent No.: US 9,268,875 B2
(45) Date of Patent: Feb. 23, 2016

(54) EXTENSIBLE CONTENT FOCUS MODE

(75) Inventors: Jonathan Thomas Campbell, Redmond, WA (US); Robin Marie Miller, Seattle, WA (US); Dhivya Padmanabhan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 580 days.

(21) Appl. No.: 13/548,897

(22) Filed: Jul. 13, 2012

(65) Prior Publication Data

US 2014/0019849 A1 Jan. 16, 2014

(51) Int. Cl.
*G06F 17/22* (2006.01)
*G06F 17/30* (2006.01)
*G06F 3/0481* (2013.01)

(52) U.S. Cl.
CPC ........ *G06F 17/30905* (2013.01); *G06F 3/0481* (2013.01); *G06F 17/2247* (2013.01)

(58) Field of Classification Search
USPC ......... 715/204, 205, 234, 236, 252, 726, 760, 715/762, 763, 768, 802
See application file for complete search history.

(56) References Cited

U.S. PATENT DOCUMENTS

| | | | | |
|---|---|---|---|---|
| 5,687,331 A * | 11/1997 | Volk et al. | | 715/840 |
| 6,249,284 B1 * | 6/2001 | Bogdan | | 715/764 |
| 6,421,065 B1 | 7/2002 | Walden et al. | | |
| 6,614,457 B1 * | 9/2003 | Sanada et al. | | 715/840 |
| 6,683,626 B1 * | 1/2004 | Abellera | | 715/785 |
| 6,892,360 B1 * | 5/2005 | Pabla et al. | | 715/802 |
| 7,327,349 B2 | 2/2008 | Robbins et al. | | |
| 7,528,847 B2 | 5/2009 | Braun et al. | | |
| 7,571,393 B2 * | 8/2009 | Premchandran et al. | | 715/767 |
| 7,735,016 B2 * | 6/2010 | Celik et al. | | 715/767 |
| 7,889,212 B2 | 2/2011 | Schulz et al. | | |
| 8,132,109 B2 * | 3/2012 | Bockus et al. | | 715/746 |
| 8,332,769 B2 * | 12/2012 | Celik et al. | | 715/767 |
| 8,543,668 B1 * | 9/2013 | Long | | 709/219 |
| 8,606,329 B2 * | 12/2013 | Yu et al. | | 455/566 |
| 8,745,515 B2 * | 6/2014 | Makela | | 715/767 |
| 8,799,802 B2 * | 8/2014 | Makela | | 715/773 |
| 2002/0175951 A1 * | 11/2002 | Gajewska et al. | | 345/802 |
| 2003/0001907 A1 * | 1/2003 | Bergsten et al. | | 345/853 |
| 2003/0014401 A1 * | 1/2003 | Goloshubin et al. | | 707/3 |
| 2003/0231210 A1 * | 12/2003 | Anderson et al. | | 345/767 |

(Continued)

OTHER PUBLICATIONS

International Search Report dated Jan. 3, 2014 in International Application No. PCT/US2013/049823, 12 pp.

(Continued)

*Primary Examiner* — Maikhanh Nguyen
(74) *Attorney, Agent, or Firm* — Julie Kane Akhter; Danielle Johnston Holmes; Micky Minhas

(57) ABSTRACT

Technologies are described herein for providing a focus-on-content (FOC) mode for a content page. The content page may be received. The content page may include a content portion and various other portions. The content page may be configured in a first state. Code configured to transform the content page from the first state to a second state may be received. The second state may place a greater focus on the content portion and produce a reduced focus on the other portions than the first state. The code may be inserted into the content page. A user instruction to enable the FOC mode may be received. Response to receiving the user instruction to enable the FOC mode, the content page may be transformed from the first state to the second state in accordance with the code.

20 Claims, 7 Drawing Sheets

(56) References Cited

U.S. PATENT DOCUMENTS

| | | | |
|---|---|---|---|
| 2003/0233652 A1* | 12/2003 | Hsieh | 725/38 |
| 2003/0237043 A1 | 12/2003 | Novak et al. | |
| 2004/0041837 A1* | 3/2004 | Yamaguchi et al. | 345/764 |
| 2005/0086609 A1 | 4/2005 | Cohen | |
| 2005/0097479 A1* | 5/2005 | Takabe et al. | 715/851 |
| 2005/0125740 A1* | 6/2005 | Clow et al. | 715/794 |
| 2005/0210399 A1* | 9/2005 | Filner et al. | 715/767 |
| 2006/0112346 A1* | 5/2006 | Miksovsky et al. | 715/764 |
| 2006/0206832 A1* | 9/2006 | Celik et al. | 715/767 |
| 2006/0277478 A1 | 12/2006 | Seraji et al. | |
| 2008/0077857 A1* | 3/2008 | Olson | 715/246 |
| 2008/0092039 A1 | 4/2008 | Brockway et al. | |
| 2008/0222530 A1* | 9/2008 | Lakshmanan et al. | 715/735 |
| 2008/0301100 A1* | 12/2008 | Wroblewski | G06F 17/30864 |
| 2008/0301573 A1* | 12/2008 | Chi | G06F 17/30864 715/771 |
| 2008/0301578 A1* | 12/2008 | Olson | 715/802 |
| 2010/0293510 A1 | 11/2010 | Bockus et al. | |
| 2010/0306642 A1* | 12/2010 | Lowet | G06F 17/30873 715/234 |
| 2011/0085024 A1 | 4/2011 | Ota | |

OTHER PUBLICATIONS

Baudisch et al., "Keeping things in context: A comparative evaluation of focus plus context screens, overviews, and zooming," 2002, Proceedings of the SIGCHI conference on human factors in computing systems: changing our world, changing ourselves, pp. 259-266.

* cited by examiner

EXTENSIBLE CONTENT FOCUS MODE

BACKGROUND

An application program may include various user interfaces for viewing content. Such interfaces may include some combination of multiple interface elements, such as a navigation pane, a toolbar, a ribbon, a search box, a content pane, or the like. Many application program designers tightly control their user interfaces in terms of the configurability of the interface elements. That is, an application program designer may restrict a customer from significantly altering the predefined configuration of the interface elements.

By limiting the configurability of the user interface, the application program designer can have greater control over the user experience. For example, this can limit the customer from potentially creating configurations that degrade the user experience. However, there may be some instances where the customer may want to have greater ability to customize the user experience. In this regard, conventional application programs may have limited or no functionality enabling such customizations.

It is with respect to these considerations and others that the disclosure made herein is presented.

SUMMARY

Technologies are described herein for providing an extensible content focus mode. A web application platform may provide functionality enabling a developer to configure a focus-on-content (FOC) mode for a content page in an extensible manner. For example, such functionality may enable the developer to configure the visual appearance of the content page when the FOC mode is enabled. These changes in visual appearance may place a greater focus on certain content in the content page, and place a reduced focus on other content and/or non-content portions of the content page.

In some example technologies, a method for providing a FOC mode for a content page is provided. The method may receive the content page, which includes a content portion and various other portions. The content page may be configured in a first state. The method may receive code configured to transform the content page from the first state to a second state. The second state may place a greater focus on the content portion and place a reduced focus on the other portions than the first state. The method may insert the code into the content page. The method may also receive a user instruction to enable the FOC mode. Responsive to receiving the user instruction to enable the FOC mode, the method may transform the content page from the first state to the second state in accordance with the code.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
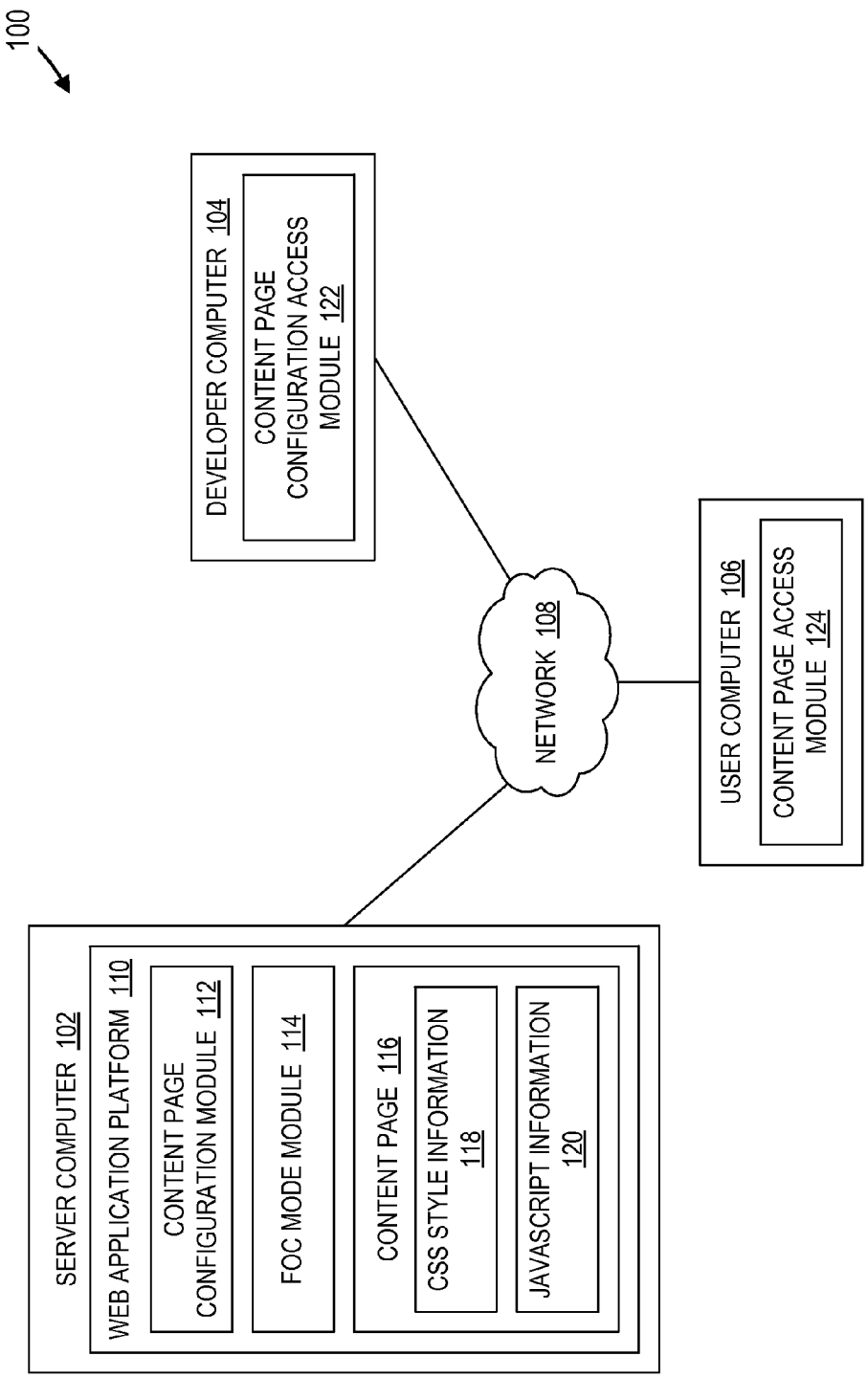
FIG. 1 is a block diagram illustrating an example web application platform architecture, in accordance with some embodiments.

The following detailed description is generally directed to concepts and technologies for providing an extensible focus-on-content ("FOC") mode. Through the use of the concepts and technologies described herein, a developer can configure the FOC mode on an application program. Because the FOC mode is extensible, the customer can customize the FOC mode to behave differently in light of various scenarios that may be encountered within the application program.

The application program may include one or more web pages (hereinafter referred to as "content pages"). Generally, each content page may include at least one content portion. In some cases, each content page may also include at least one non-content portion. Each content portion may include content that is requested by an end user. Each non-content portion may be configured to display information unrelated to or separate from the content that is requested by the end user. In one example, an illustrative content page may include a content pane (i.e., a content portion) and a navigation pane (i.e., a non-content portion). The content pane may be configured to display a requested document. The navigation pane may be configured to display an interactive table of contents that enables the end user to jump to specific portions of the document in the content pane. In another example, an illustrative content page may include text (i.e., a first content portion) and an image (i.e., a second content portion).

The application program may be configured to provide functionality enabling the configuration of a FOC mode for one or more content pages in the application program. According to some embodiments, the FOC mode may be configured to operate at a content page level. That is, the FOC mode can be enabled and disabled with respect to each content page. According to some other embodiments, the FOC mode may be configured to operate at an interface element level. That is, a given content page may include multiple interface elements, each of which is attached to its own FOC mode that can be enabled and disabled. For purposes of simplicity and illustration, embodiments described herein may refer primarily to the configuration of an FOC mode that operates at a content page level. However, it should be appreciated that these embodiments may be similarly implemented for an FOC mode that operates at an interface element level.

According to some embodiments, the application program may be configured by a developer and deployed to various end users. For example, in an enterprise scenario, the application program may be an intranet portal deployed on an enterprise network. The intranet portal may include multiple content pages containing information shared between end users (e.g., employees) within the enterprise. In this example, the developer may configure the FOC mode for the content pages of the intranet portal. Upon configuring the FOC mode for the content pages, the developer may deploy the intranet portal such that the end users can access the content pages via the enterprise network. According to some other embodiments, the application program may be configured by an end user. For example, the application program may be a desktop application program configured to execute locally on a desktop computing device controlled by an end user. For purposes of simplicity and illustration, embodiments described herein may refer primarily to implementations of the FOC mode as configured by a developer. However, it should be appreciated that these embodiments may be similarly implemented for implementations of the FOC mode as configured by an end user.

According to various embodiments, for a given content page, developer may configure the FOC mode for the content page. In particular, when the FOC mode is disabled, the content page may be configured and provided in a first state. When the FOC mode is enabled, the content page may be configured and provided in a second state. The first state may be a default or initial state of the content page without modification. The second state may be a modified state of the content page in which a greater focus is placed on a particular content portion of the content page and a reduced focus is placed on the non-content portion and/or other content portions of the content page.

In one illustrative example of the FOC mode, the content page may include a content pane and a navigation pane as previously described. In the first state of the content page (i.e., when the FOC mode is disabled), the content pane and the navigation pane may be visible to an end user. In the second state of the content page (i.e., when the FOC mode is enabled), greater focus may be placed on the content pane and reduced focus may be placed on the navigation pane. For example, in the second state, the navigation pane may be removed or hidden, and the content pane may be resized to take over at least part of the screen previously occupied by the navigation pane. As a result, a greater amount of content can be shown within the content pane.

In this example, the content shown in the content pane may remain the same between the first state and the second state. For example, the content pane may be configured to display a word processing document. In the first state, the content pane may be configured to display some portion of the word processing document at a time. In the second state, the content pane may be configured to display a larger portion of the same document at a time due to the larger size of the content pane.

In another illustrative example of the FOC mode, the content page may include text and a static (e.g., non-interactive) image. In the first state of the content page (i.e., when the FOC mode is disabled), the text and the static image may be visible to an end user. In the second state of the content page (i.e., when the FOC mode is enabled), greater focus may be placed on the static image and reduced focus may be placed on the text. For example, in the second state, the text may be removed or hidden, thereby leaving unoccupied space. However, instead of merely resizing the static image to cover the unoccupied space, the content page in the second state may be configured to display a dynamic (e.g., interactive) image in place of the text and the static image.

In this example, the dynamic image may be configured to provide more detailed content compared to the static image. For example, the first state of the content page may be configured to display a static bar diagram. The static bar diagram may be a single view configured according to a fixed set of inputs. The second state of the content page may be configured to display a dynamic bar diagram. Unlike the static bar diagram, the dynamic bar diagram may include interactive sliding controls for various inputs. An end user can use the sliding controls to change the various inputs, thereby modifying the dynamic bar diagram in real-time or near real-time to provide multiple views configured according to multiple sets of inputs.

According to various embodiments, the FOC mode may be implemented by using Cascading Style Sheets ("CSS") styles and/or JAVASCRIPT code. In the case of CSS styles, when the FOC mode is enabled for a given content page, a CSS style may be applied to the Hypertext Markup Language ("HTML") structure of content page, thereby transforming the content page from the first state to the second state. In particular, the CSS style may be configured as a descendant of the FOC mode. When the FOC mode is enabled, the CSS style may be applied to the content page. When the FOC mode is disabled, the CSS style may be removed from the content page, thereby transforming the content page from the second state back to the first state.

In the case of JAVASCRIPT code, an enable FOC mode function may be executed when the FOC mode is enabled, and a disable FOC mode function may be executed when the FOC mode is disabled. A first event may be configured to trigger the enable FOC mode function, and a second event may be configured to trigger the disable FOC mode function. Some example events may include a keystroke, a mouse click, a mouseover, a gesture, a touch input, a voice command, or the like. A first JAVASCRIPT event handler may be registered for the first event. A second JAVASCRIPT event handler may be registered for the second event. At the occurrence of the first event, the enable FOC mode function may be executed to transform the content page from the first state to the second state. At the occurrence of the second event, the disable FOC mode function may be executed to transform the content page from the second state back to the first state.

Each content page may be configured to include functionality for enabling or disabling the FOC mode. For example, each content page may include a FOC mode button. When an end user clicks on or otherwise selects the FOC mode button, the end user can enable and/or disable the FOC mode. In other examples, the FOC mode may be enabled and/or disabled via any suitable input method, including keystrokes, mouse clicks, mouseovers, gestures, touch input, voice commands, or the like.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing an extensible content focus mode. In particular, FIG. 1 is a block diagram illustrating an example web application platform architecture 100, in accordance with some embodiments. The web application platform architecture 100 may include a server computer 102, a developer computer 104, and one or more user computers such as a user computer 106. The server computer 102, the developer computer 104, and the user computer 106 may be communicatively coupled via a network 108. For example, the network 108 may be an enterprise network.

The server computer 102 may include a web application platform 110. The web application platform 110 may include content page configuration module 112, a FOC mode module 114, and multiple content pages including a content page 116. The content page 116 may include CSS style information 118 and JAVASCRIPT information 120. Each content page contained in the web application platform 110 may include its own CSS style information and/or JAVASCRIPT information related to implementing its own FOC mode. The developer computer 104 may include a content page configuration access module 122, which is configured to access the content page configuration module 112 in order to configure the CSS style information 118 and/or the JAVASCRIPT information 120 for the content page 116. The user computer 106 may include a content page access module 124, which is configured to access the content pages, including the content page 116. For example, the content page access module 124 may be a web browser.

The content page 116 may include one or more content portions that contain content to be provided to an end user upon request. For example, the content portions may include text, images, audio, video, other multimedia, or combinations thereof related to a particular topic or subject. In some instances, the content page 116 may also include one or more non-content portions. The non-content portions may include information unrelated to or separate from the content requested by the end user. Some examples of non-content portions may include navigation panes, toolbars, and search boxes. The first state of the content page 116 may refer to the default state of the content page 116 as programmed to include its various content portions and/or non-content portions.

A developer may access the content page configuration module 112 in order to configure a FOC mode for the content page 116. According to various embodiments, the administrator may utilize the content page configuration module 112 to configure the CSS style information 118 and/or the JAVASCRIPT information 120. When the FOC mode for the content page 116 is enabled, the content page 116 may be transitioned from the first state to the second state. In particular, the second state of the content page 116 may be configured in accordance with the CSS style information 118 and/or the JAVASCRIPT information 120. When the FOC mode for the content page 116 is disabled, the content page 116 may be transitioned from the second state back to the first state.

The second state of the content page 116 may place a greater focus on one or more content portions of the content page 116, and place a reduced focus on other content portions and/or non-content portions of the content page 116. The CSS style information 118 and/or the JAVASCRIPT information 120 may be configured to generate the second state of the content page 116 by adding interface elements, removing interface elements, rearranging interface elements, resizing interface elements, providing more interactive content, and/or providing more detailed content.

The CSS style information 118 may include a CSS style configured to alter a visual appearance of the content page 116 in accordance with any suitable functionality provided by the CSS language. The developer may utilize the content page configuration module 112 to add a definition of the CSS style into the HTML structure of the content page 116. In particular, the definition of the CSS style may configure the CSS style as an ancestor of an interface element of the content page 116.

An illustrative CSS style may correspond to a class name called "focusOnContentMode". The CSS style may be defined as follows, in which a left-hand navigation pane referred by "leftHandNavigationBox" is hidden.

```
.focusOnContentMode #leftHandNevigationBox
{
    display: none;
}
```

As noted in the above CSS code example, the CSS style is an ancestor to the left-hand navigation box. This prevents the CSS style from being applied to the content page 116 until the FOC mode has been enabled. When the FOC mode is enabled, the FOC mode module 114 may be configured to add the class name "focusOnContentMode" to a high-level HTML element of the content page 116 (e.g., <body class="focusOnContentMode">). In this manner, the web application platform 110 may render the content page 116 in accordance with the defined CSS style. When the FOC mode is disabled, the FOC mode module 114 may be configured to remove the class name "focusOnContentMode" from the high-level HTML element of the content page 116 (e.g., <body>). In this manner, the web application platform 110 may render the content page 116 without the defined CSS style.

The JAVASCRIPT information 120 may include two functions: an enable FOC mode function and a disable FOC mode function. The enable FOC mode function may be executed when the FOC mode is enabled. The enable FOC mode function may transform the content page 116 from the first state to the second state. The disable FOC mode function may be executed when the FOC mode is disabled. The disable FOC mode function may transform the content page 116 from the second state back to the first state.

The JAVASCRIPT information 120 may specify that the enable FOC mode function is triggered by a first event. The JAVASCRIPT information 120 may also specify that the disable FOC mode function is triggered by a second event. Some example events may include a keystroke, a mouse click, a mouse over, a gesture, a touch input, a voice command, or the like. A developer may register the first event with a first JAVASCRIPT event handler. The developer may also register the second event with a second JAVASCRIPT event handler.

At the occurrence of the first event, the enable FOC mode function may be executed, thereby transforming the content page 116 from the first state to the second state. For example, an illustrative enable FOC function may be configured to manipulate a document object model of the content page 116 by adding elements, removing elements, instantiating new controls, or the like. At the occurrence of the second event, the disable FOC mode function may be executed, thereby transforming the content page 116 from the second state back to the first state.

In some embodiments, the content page 116 may implement the FOC mode using either the CSS style information 118 or the JAVASCRIPT information 120. In some other embodiments, the content page 116 may be configured to implement the FOC mode using both the CSS style information 118 and the JAVASCRIPT information 120. Using only the CSS style information 118 may limit the FOC mode to only visual modifications supported by the CSS language. In contrast, using the JAVASCRIPT information 120 can support greater customizations due to the flexibility of JAVASCRIPT.

Figure 2A:
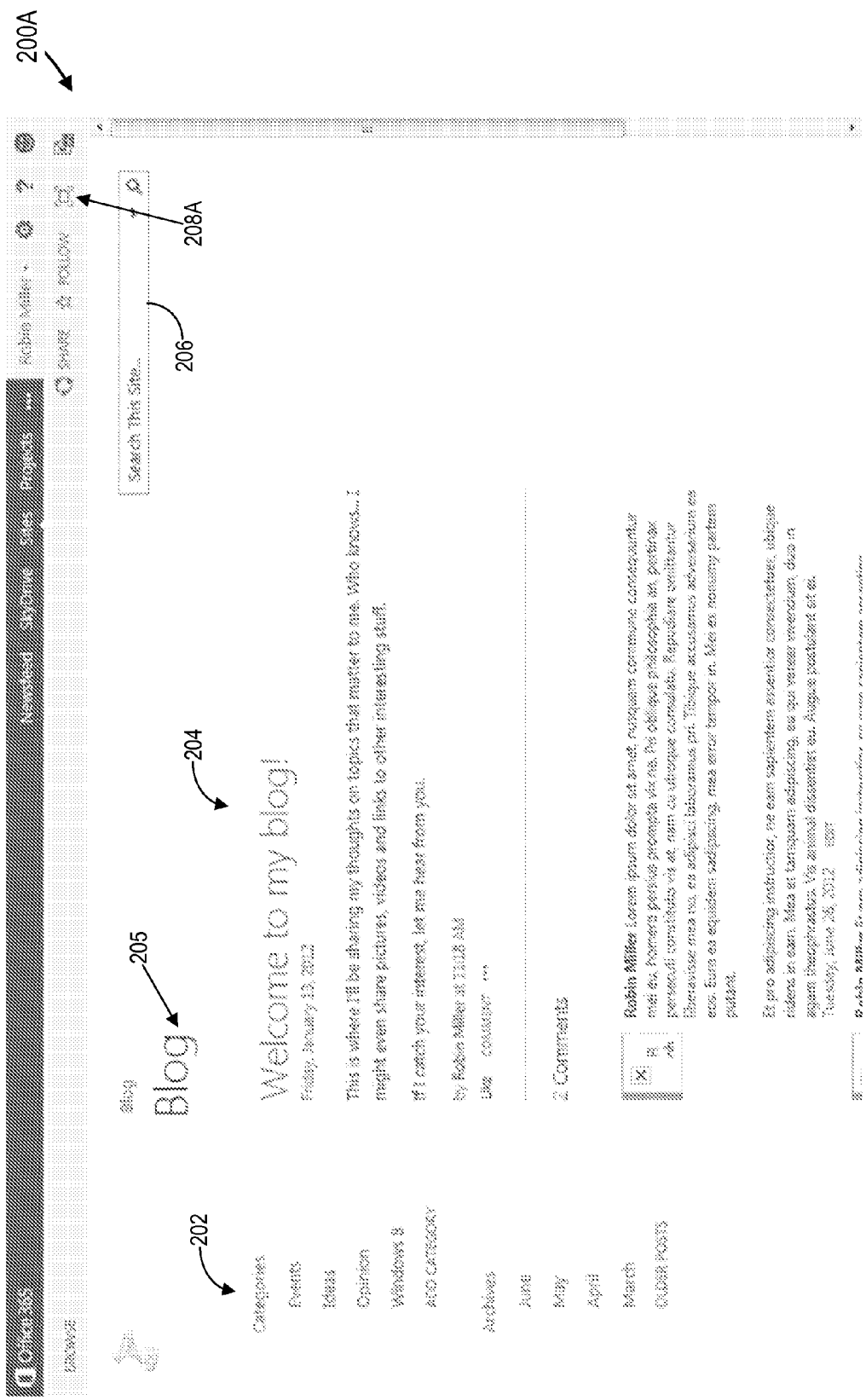
FIG. 2A is a screen display diagram illustrating a first state of a first example content page, in accordance with some embodiments.
Figure 2B:
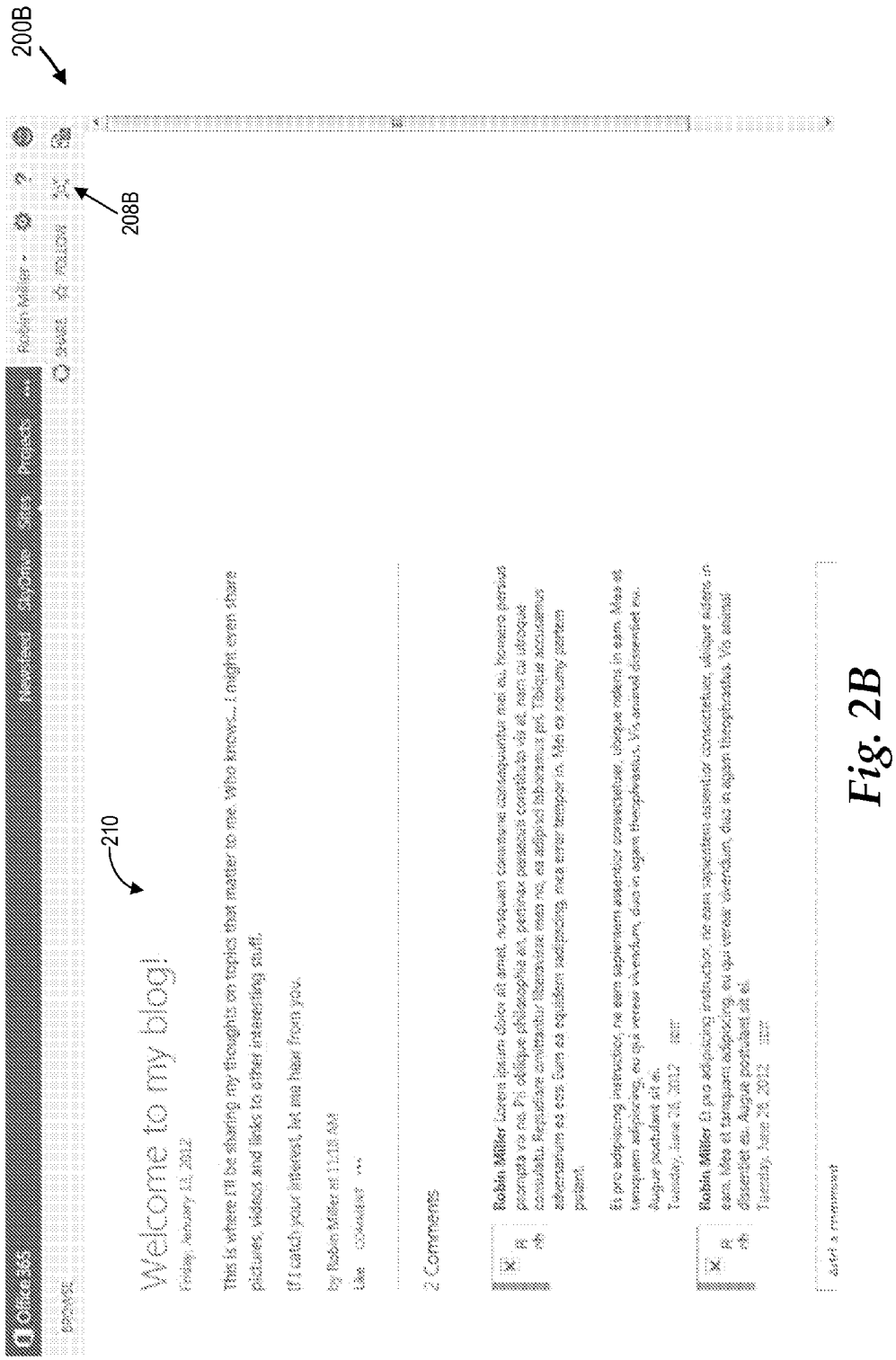
FIG. 2B is a screen display diagram illustrating a second state of the first example content page, in accordance with some embodiments.
Figure 3A:
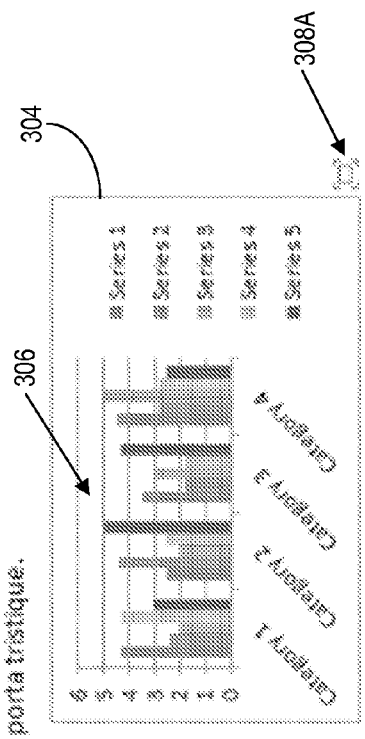
FIG. 3A is a screen display diagram illustrating a first state of a second example content page, in accordance with some embodiments.
Figure 3B:
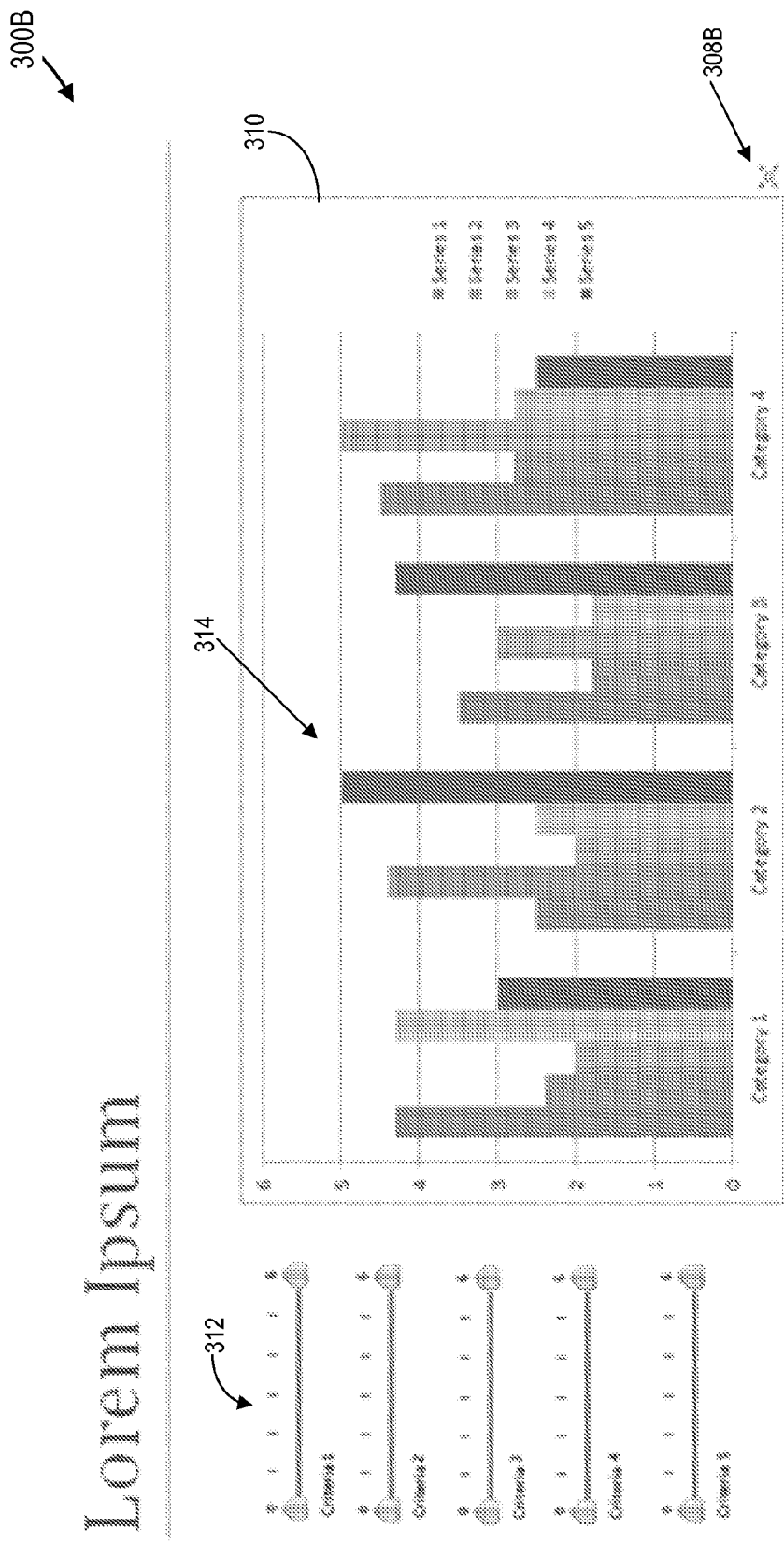
FIG. 3B is a screen display diagram illustrating a second state of the second example content page, in accordance with some embodiments.

Referring now to FIGS. 2A-2B and 3A-3B, additional details regarding the operation of the FOC mode will be provided with reference to illustrative examples. In particular, FIG. 2A is a screen display diagram illustrating a first state 200A of a first example content page, in accordance with some embodiments. FIG. 2B is a screen display diagram illustrating a second state 200B of the first example content page, in accordance with some embodiments. FIG. 3A is a screen display diagram illustrating a first state 300A of a second example content page, in accordance with some embodiments. FIG. 3B is a screen display diagram illustrating a second state 300B of the second example content page, in accordance with some embodiments.

As illustrated in FIG. 2A, the first state 200A of the content page may include a navigation pane 202, a content pane 204, a title area, 205, and a search box 206. The first state 200A may also include a first FOC mode button 208A. When an end user selects the first FOC mode button 208A, the content page may transition from the first state 200A to the second state 200B.

As illustrated in FIG. 2B, the second state 200B of the content page may include a resized content pane 210. The navigation pane 202 and the search box 206 have been hidden or removed. As a result, the resized content pane 210 may be larger than content pane 204 due to the extra screen space made available without the navigation pane 202, the title area 205, or the search box 206. The second state 200B may also include a second FOC mode button 208B. When an end user selects the second FOC mode button 208B, the content page may transition from the second state 200B back to the first state 200A.

As illustrated in FIG. 3A, the first state 300A of the content page may include a text 302 and a static image 304. The static image 304 may include a non-interactive bar graph 306. The first state 300A may also include a first FOC mode button 308A. When an end user selects the first FOC mode button 308A, the content page may transition from the first state 300A to the second state 300B.

As illustrated in FIG. 3B, the second state 300B of the content page may include a dynamic image 310, which has replaced the text 302 and the static image 304. The dynamic image 310 may include slide controls 312 and an interactive bar graph 314. Unlike the static image 304, the dynamic image 310 may include the slide controls 312 for configuring various criteria. In the static image 304, these criteria controlled by the slide controls 312 may be fixed. As a result, the non-interactive bar graph 306 may be fixed. In the dynamic image 310, an end user may interact with the slide controls 312 to change the values of the various criteria. These changes to the values of the various criteria may cause the changes to the interactive bar graph 314. The second state 300B may also include a second FOC mode button 308B. When an end user selects the second FOC mode button 308B, the content page may transition from the second state 300B back to the first state 300A.

Figure 4:
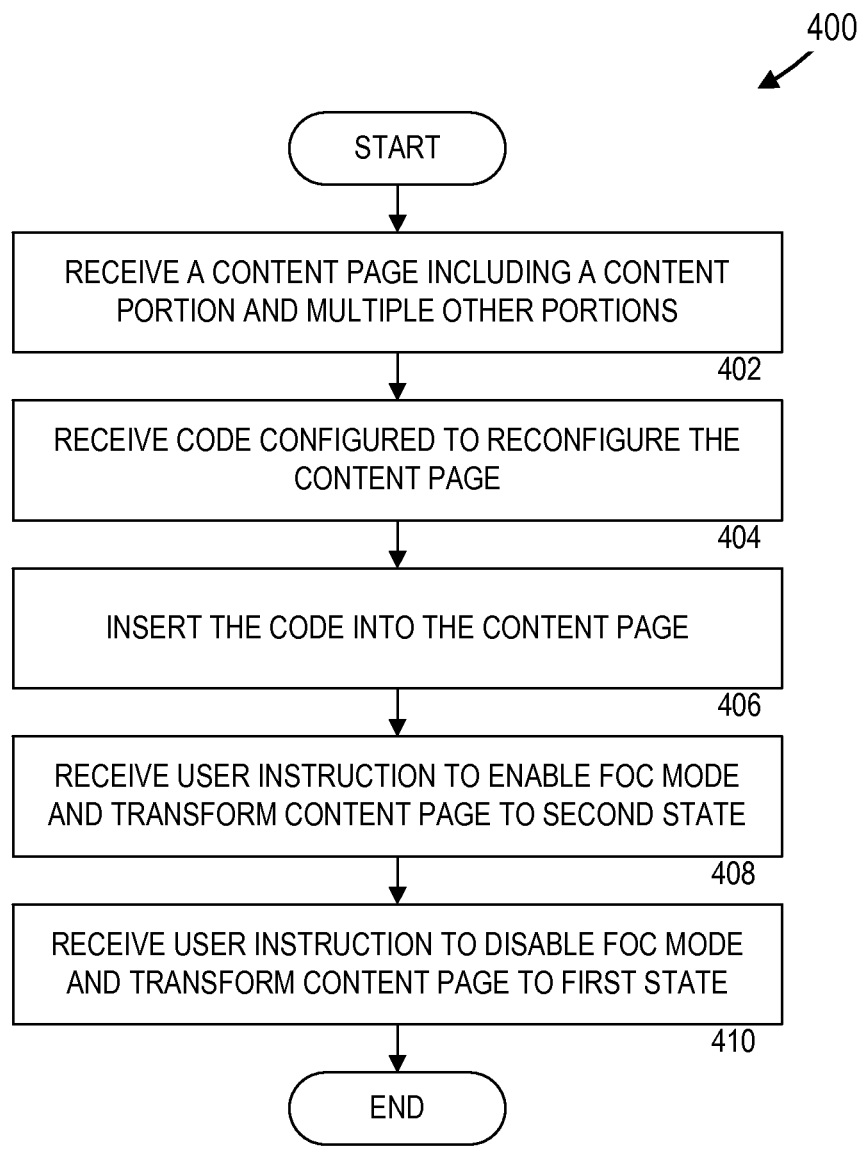
FIG. 4 is a flow diagram illustrating an example method for providing an extensible content focus mode, in accordance with some embodiments.

Referring now to FIG. 4, additional details regarding the operation of the web application platform 110 will be provided. FIG. 4 is a flow diagram illustrating an example method for providing an extensible content focus mode, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where the content page configuration module 112 receives a content page, such as the 116. The content page may include a content portion and multiple other portions. The other portion may include other content portions and/or non-content portions. The first state of the content page may refer to the default state content page as it has been programmed. After operation 402, the routine 400 proceeds to operation 404.

At operation 404, the content page configuration module 112 may receive code configured to transform the content page from the first state to a second state. In particular, the second state may be a content-focused state in which a greater focus is placed on the content portion and a reduced focus is placed on the other portions of the content page. The second state of the content page may be generated by adding interface elements, removing interface elements, rearranging interface elements, resizing interface elements, providing more interactive content, and/or providing more detailed content with respect to the first state of the content page.

The code may include CSS code and/or JAVASCRIPT code. The CSS code may be configured to define a CSS style. In particular, the CSS code may be configured to define the CSS style as an ancestor of an interface element in the content page. Further, the CSS style may correspond to a class name. The JAVASCRIPT code may be configured to define an enable FOC mode function and a disable FOC mode function. The enable FOC mode function may be configured to transform the content page from the first state to the second state. The disable FOC mode function may be configured to transform the content page from the second state to the first state. After operation 404, the routine 400 proceeds to operation 406.

At operation 406, the content page configuration module 112 inserts the code into the content page. In the case of the CSS code, the content page configuration module 112 may be configured to insert the CSS code configured to define the CSS style in an HTML structure of the content page. In the case of the JAVASCRIPT code, the content page configuration module 112 may be configured to insert the JAVASCRIPT code configured to define the enable FOC function and the disable FOC function into the HTML structure of the content page, register a first JAVASCRIPT event handler for a first event configured to trigger the enable FOC mode function, and register a second JAVASCRIPT event handler for a second event configured to trigger the disable FOC mode function. After operation 406, the routine 400 proceeds to operation 408.

At operation 408, the content page may receive a user instruction to enable the FOC mode. For example, the content page may include a FOC mode button, and an end user may select the FOC mode button to enable the FOC mode. Responsive to receiving the user instruction to enable the FOC mode, the content page may be transformed from the first state to the second state. In the case of the CSS code, the FOC mode module 114 may be configured to insert the class name into an HTML element of the content page. In this way, the CSS style is applied when the content page is provided. In the case of the JAVASCRIPT code, the web application platform 110 may be configured to recognize an occurrence of the first event. At the occurrence of the first event, web application platform 110 may be configured to execute the enable FOC mode function. After operation 406, the routine 400 proceeds to operation 410.

At operation 410, the content page may receive a user instruction to disable the FOC mode. For example, the content page may include a FOC mode button, and an end user may select the FOC mode button to disable the FOC mode. Responsive to receiving the user instruction to disable the FOC mode, the content page may be transformed from the second state to the first state. In the case of the CSS code, the FOC mode module 114 may be configured to remove the class name from the HTML element of the content page. In this way, the CSS style is not applied when the content page is provided. In the case of the JAVASCRIPT code, the web application platform 110 may be configured to recognize an occurrence of the second event. At the occurrence of the second event, the web application platform 110 may be configured to execute the disable FOC mode function. After operation 410, the routine 400 may either repeat (e.g., periodically, continuously, or on demand as needed) or terminate.

Figure 5:
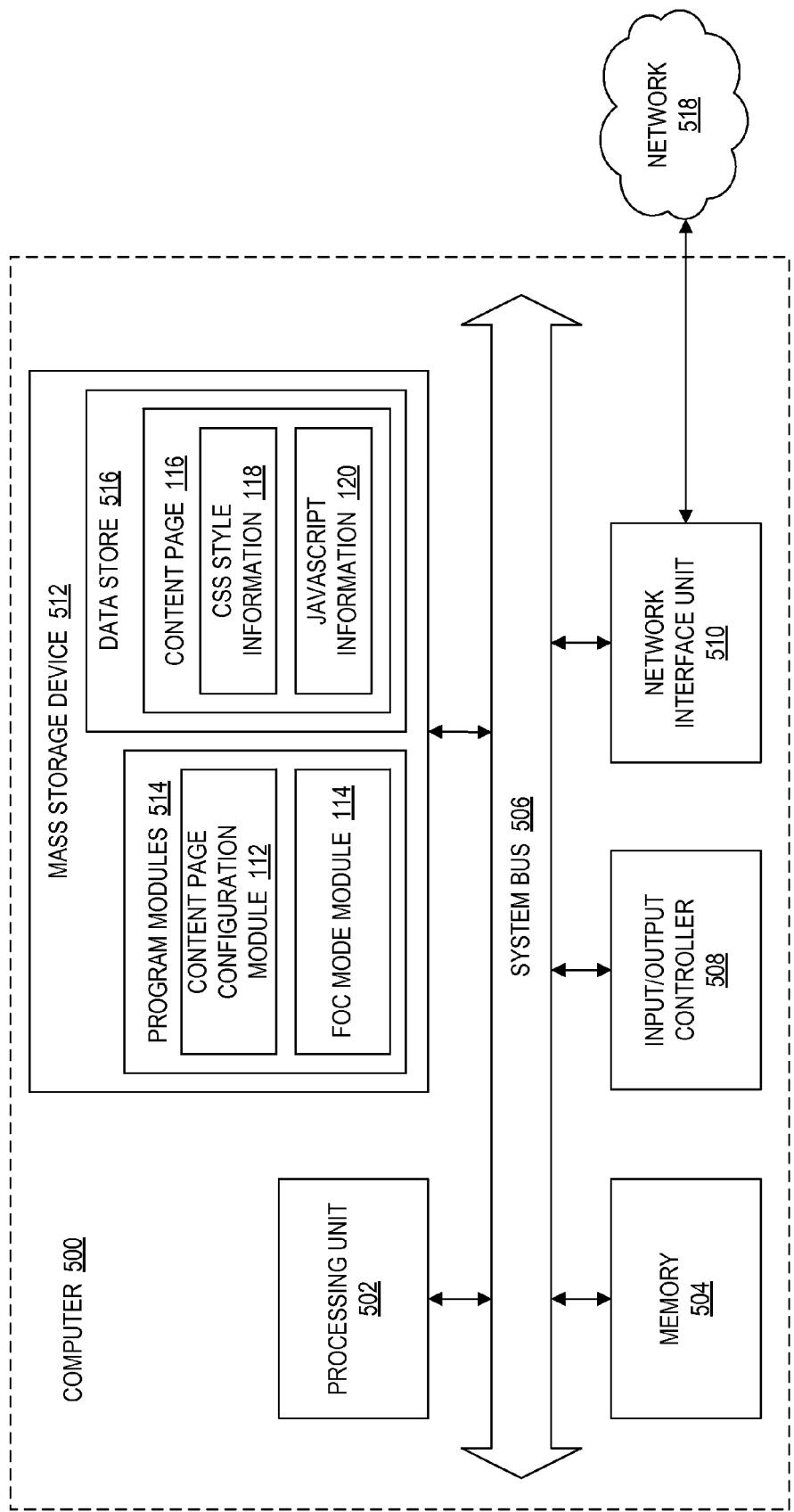
FIG. 5 is a computer architecture diagram showing an illustrative computer hardware architecture for a computing system capable of implementing the embodiments presented herein.

FIG. 5 is an example computer architecture diagram illustrating a computer 500. Examples of the computer 500 may include the server computer 102, the developer computer 104, and the user computer 106. The computer 500 may include a central processing unit 502, a system memory 504, and a system bus 506 that couples the memory 504 to the central processing unit 502. The computer 500 may further include a mass storage device 512 for storing one or more program modules 514 and a data store 516. Examples of the program modules 514 may include the web application platform 110, the content page configuration module 112, the FOC mode module 114, the content page configuration access module 122, and the content page access module 124. The data store 516 may store the content page 116, including the CSS style information 118 and the JAVASCRIPT information 120. A combination of one or more of the program modules 514 may be configured to perform a method for providing an extensible content focus mode. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. An example of the network 518 may be the network 108. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. The input/output controller 508 may also be configured to receive user input via gestures, touch (e.g., via a touchscreen), and/or voice. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to generate field sets. The program modules 514 may also provide various tools or techniques by which the computer 500 may participate within the overall systems or operating environments using the components, flows, and data structures discussed throughout this description. For example, the program modules 514 may implement interfaces for generating field sets.

In general, the program modules 514 may, when loaded into the processing unit 502 and executed, transform the processing unit 502 and the overall computer 500 from a general-purpose computing system into a special-purpose computing system customized to generate field sets. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that concepts and technologies for proving an extensible content focus mode are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a focus-on-content (FOC) mode for a content page, the computer-implemented method comprising:
   receiving, at a computer, the content page comprising a content portion and a plurality of other portions, the content page configured in a first state;
   receiving, at the computer, Cascading Style Sheets (CSS) code defining a CSS style as an ancestor of an interface element in the content page, the CSS style corresponding to a class name, and the CSS code configured to transform the content page from the first state to a second state, the second state placing a greater focus on the content portion and placing a reduced focus on the plurality of other portions than the first state;
   inserting, at the computer, the CSS code defining the CSS style into a Hypertext Markup Language (HTML) structure of the content page;
   receiving, at the computer, a user selection of a FOC mode button in the content page;
   responsive to receiving the user selection of the FOC mode button, enabling the FOC mode and transforming the content page by
      inserting the class name into a HTML element of the content page, and transforming the content page from the first state to the second state in accordance with the CSS code;
   receiving, at the computer, a second selection of the FOC mode button; and
   responsive to receiving the second selection of the FOC mode button, disabling the FOC mode and transforming the content page by
      removing the class name from the HTML element of the content page, and transforming the content page from the second state to the first state.

2. The computer-implemented method of claim 1, wherein transforming the content page from the first state to the second state in accordance with the CSS code comprises generating the second state by adding interface elements.

3. The computer-implemented method of claim 1, wherein transforming the content page from the first state to the second state in accordance with the CSS code comprises generating the second state by removing interface elements.

4. The computer-implemented method of claim 1, wherein transforming the content page from the first state to the second state in accordance with the CSS code comprises generating the second state by rearranging interface elements.

5. The computer-implemented method of claim 1, wherein transforming the content page from the first state to the second state in accordance with the CSS code comprises generating the second state by resizing interface elements.

6. The computer-implemented method of claim 1, wherein transforming the content page from the first state to the second state in accordance with the CSS code comprises generating the second state by providing more interactive content with respect to the first state.

7. An optical, magnetic, or semiconductor computer-readable storage medium having computer-executable instructions stored thereon which, when executed by a computer, cause the computer to perform operations comprising:
   receiving a content page comprising a content portion and a plurality of other portions, the content page configured in a first state;
   receiving Cascading Style Sheets (CSS) code defining a CSS style as an ancestor of an interface element in the content page, the CSS style corresponding to a class name, and the CSS code configured to transform the content page from the first state to a second state, the second state placing a greater focus on the content portion and placing a reduced focus on the plurality of other portions than the first state;
   inserting the CSS code defining the CSS style into a Hypertext Markup Language (HTML) structure of the content page;
   receiving a first user selection of a focus-on-content (FOC) mode button in the content page;
   responsive to receiving the first user selection of the FOC mode button, enabling the FOC mode and transforming the content page by
      inserting the class name into a HTML element of the content page, and transforming the content page the content page from the first state to the second state in accordance with the CSS code;
   receiving a second user selection of the FOC mode button; and responsive to receiving the second user selection of the FOC mode button, disabling the FOC mode and transforming the content page by removing the class name from the HTML element of the content page, and transforming the content page from the second state to the first state in accordance with the CSS code.

8. The optical, magnetic, or semiconductor computer-readable storage medium of claim 7, wherein transforming the content page from the first state to the second state in accordance with the CSS code comprises generating the second state by adding interface elements.

9. The optical, magnetic, or semiconductor computer-readable storage medium of claim 7, wherein transforming the content page from the first state to the second state in accordance with the CSS code comprises generating the second state by removing interface elements.

10. The optical, magnetic, or semiconductor computer-readable storage medium of claim 7, wherein transforming the content page from the first state to the second state in accordance with the CSS code comprises generating the second state by resizing interface elements.

11. The optical, magnetic, or semiconductor computer-readable storage medium of claim 7, wherein transforming the content page from the first state to the second state in accordance with the CSS code comprises generating the second state by providing more interactive content with respect to the first state.

12. The optical, magnetic, or semiconductor computer-readable storage medium of claim 7, wherein transforming the content page from the first state to the second state in accordance with the CSS code comprises generating the second state by providing more detailed content with respect to the first state.

13. A computer system, comprising:
a processor;
a memory communicatively coupled to the processor; and
a program module which executes in the processor from the memory and which, when executed by the processor, causes the processor to
receive a content page comprising a content portion and a plurality of other portions,
receive Cascading Style Sheets (CSS) code defining a CSS style, the CSS code defining the CSS style as an ancestor of an interface element in the content page, the CSS style corresponding to a class name,
receive JAVASCRIPT code defining an enable FOC mode function and a disable FOC mode function, the enable FOC mode function configured to transform the content page from a first state to a second state, the disable FOC mode function configured to transform the content page from the second state to the first state,
insert the CSS code defining the CSS style into a Hypertext Markup Language (HTML) structure of the content page,
insert the JAVASCRIPT code defining the enable FOC mode function into the HTML structure of the content page,
register a first JAVASCRIPT event handler for a first event configured to trigger the enable FOC mode function,
register a second JAVASCRIPT event hander for a second event configured to trigger the disable FOC mode function,
receive a first user instruction to enable a focus-on-content (FOC) mode,
identify an occurrence of the first event,
responsive to identifying the occurrence of the first event, execute the enable FOC mode function transforming the content page from the first state to the second state,
responsive to receiving the first user instruction to enable the FOC mode, insert the class name into a HTML element of the content page, and transform the content page which applies the CSS style,
receive a second user instruction to disable the FOC mode,
identify an occurrence of the second event,
execute the disable FOC mode function transforming the content page from the second state to the first state, and
responsive to receiving the second user instruction to disable the FOC mode, remove the class name from the HTML element of the content page, and transform the content page which does not apply the CSS style.

14. The computer system of claim 13, wherein receiving the user instruction to enable the FOC mode comprises receiving a user selection of a FOC mode button in the content page.

15. The computer system of claim 13, wherein transforming the content page from the first state to the second state in accordance with the JAVASCRIPT code comprises generating the second state by adding interface elements.

16. The computer system of claim 13, wherein transforming the content page from the first state to the second state in accordance with the JAVASCRIPT code comprises generating the second state by removing interface elements.

17. The computer system of claim 13, wherein transforming the content page from the first state to the second state in accordance with the JAVASCRIPT code comprises generating the second state by rearranging interface elements.

18. The computer system of claim 13, wherein transforming the content page from the first state to the second state in accordance with the JAVASCRIPT code comprises generating the second state by resizing interface elements.

19. The computer system of claim 13, wherein transforming the content page from the first state to the second state in accordance with the JAVASCRIPT code comprises generating the second state by providing more interactive content with respect to the first state.

20. The computer system of claim 13, wherein transforming the content page from the first state to the second state in accordance with the JAVASCRIPT code comprises generating the second state by providing more detailed content with respect to the first state.

* * * * *